(12) United States Patent
Nishimura et al.

(10) Patent No.: US 11,359,703 B2
(45) Date of Patent: Jun. 14, 2022

(54) TOROIDAL CONRTINUOUSLY VARIABLE TRANSMISSION

(71) Applicants: NSK LTD., Tokyo (JP); KAWASAKI JUKOGYO KABUSHIKI KAISHA, Hyogo (JP)

(72) Inventors: Takeshi Nishimura, Fujisawa (JP); Kippei Matsuda, Akashi (JP); Hideyuki Imai, Akashi (JP); Akihito Abe, Akashi (JP)

(73) Assignees: NSK LTD., Tokyo (JP); KAWASAKI JUKOGYO KABUSHIKI KAISHA, Hyogo (JP)

( * ) Notice: Subject to any disclaimer, the term of this patent is extended or adjusted under 35 U.S.C. 154(b) by 194 days.

(21) Appl. No.: 16/340,411

(22) PCT Filed: Nov. 9, 2017

(86) PCT No.: PCT/JP2017/040498
§ 371 (c)(1),
(2) Date: Apr. 9, 2019

(87) PCT Pub. No.: WO2018/092681
PCT Pub. Date: May 24, 2018

(65) Prior Publication Data
US 2019/0234496 A1    Aug. 1, 2019

(30) Foreign Application Priority Data

Nov. 18, 2016 (JP) .............................. JP2016-224654

(51) Int. Cl.
*F16H 15/38* (2006.01)
*F16C 19/14* (2006.01)
*F16C 25/08* (2006.01)

(52) U.S. Cl.
CPC ............. *F16H 15/38* (2013.01); *F16C 19/14* (2013.01); *F16C 25/08* (2013.01)

(58) Field of Classification Search
CPC ........... F16H 15/38; F16C 19/14; F16C 25/08
(Continued)

(56) References Cited

U.S. PATENT DOCUMENTS 6,666,791 B1 * 12/2003 Greenwood ............ F16H 15/38
476/42
6,896,415 B2 * 5/2005 Ishiwada ................. F16C 19/56
384/517

(Continued)

FOREIGN PATENT DOCUMENTS

GB     2 361 510        * 10/2001
JP     11-108139 A        4/1999
(Continued)

OTHER PUBLICATIONS

International Search Report and Written Opinion dated Jan. 16, 2018, from International Application No. PCT/JP2017/040498, 7 sheets.

*Primary Examiner* — William C Joyce
(74) *Attorney, Agent, or Firm* — Katten Muchin Rosenman LLP

(57) ABSTRACT

The present disclosures relates to a toroidal continuously variable transmission which includes: a rotating shaft; a pair of outside disks supported by a rotating shaft to rotate in synchronization with the rotating shaft; an inside disk supported by the rotating shaft to rotate relative to the rotating shaft; a pair of rolling bearing units, each including a radial rolling bearing capable of supporting an axial load to support the inside disk so that relative rotation with respect to the rotating shaft is possible; a plurality of power rollers arranged between the axial inside surfaces the outside disks and the axial outside surfaces of the inside disk to transmit (Continued)

power between them; and a preloading mechanism elastically pressing the outer ring of the radial rolling bearing in the axial direction.

2 Claims, 9 Drawing Sheets

(58) Field of Classification Search
USPC .................................. 476/42; 384/517, 518
See application file for complete search history.

(56) References Cited

U.S. PATENT DOCUMENTS

| 2005/0238274 A1* | 10/2005 | Zernikow | F16C 19/54 |
| | | | 384/517 |
| 2012/0144939 A1* | 6/2012 | Kullin | F16C 25/083 |
| | | | 74/25 |
| 2012/0243817 A1* | 9/2012 | Teimel | F16C 25/083 |
| | | | 384/518 |

FOREIGN PATENT DOCUMENTS

| JP | 2004-257533 A | 9/2004 |
| JP | 2015-090159 A | 5/2015 |
| JP | 2016-80117 A | 5/2016 |

* cited by examiner

Prior Art

Prior Art

TOROIDAL CONTRINUOUSLY VARIABLE TRANSMISSION

TECHNICAL FIELD

The present invention relates to a toroidal continuously variable transmission incorporated in aircraft generators, a variety of industrial machinery such as pumps and the like, a vehicle including an automobile, construction machinery, and the like.

BACKGROUND ART

FIG. 13 illustrates the first example of a conventional toroidal continuously variable transmission as disclosed in JP 2004-257533 A. The toroidal continuously variable transmission 1 includes a rotating shaft 2 and a pair of outside disks 3 arranged around both end portions in the axial direction of the rotating shaft 2. The pair of outside disks 3 each have an inside surface in the axial direction that is a toroidal curved surface and are supported around the rotating shaft 2 via ball splines 4 while these inside surfaces in the axial direction facing each other so as to move in a direction toward and away from each other and to rotate in synchronization with the rotating shaft 2. A sleeve 5 is supported around the middle portion in the axial direction of the rotating shaft 2 so as to rotate relative to the rotating shaft 2. A transmission gear 6 is fixed around the center portion in the axial direction of the outer circumferential surface of the sleeve 5, and on both end portions in the axial direction of the sleeve 5, a pair of disk elements 7 is supported by a spline engagement so as to be able to rotate in synchronization with the sleeve 5. The pair of disk elements 7 each have an outside surface in the axial direction that is a toroidal curved surface and faces any of the inside surfaces in the axial direction of the pair of outside disks 3. This kind of pair of disk elements 7 constitute an inside disk 8.

Incidentally, the "inside" in the axial direction refers to the center side in the axial direction of rotating shaft 2 of the toroidal continuously variable transmission 1, and conversely, the "outside" in the axial direction refers to both end sides in the axial direction of the rotating shaft 2.

A plurality of power rollers 9, the respective peripheral surfaces of which are spherical convex surfaces, are held between the inside surfaces in the axial direction of the pair of outside disks 3 and the pair of outside surfaces in the axial direction of the inside disk 8. Each of the power rollers 9 is supported by a trunnion 10 so as to be able to rotate freely, and transmits power from the pair of outside disks 3 to the inside disk 8 while rotating together with the rotation of the pair of outside disks 3. In other words, during operation of the toroidal continuously variable transmission 1, one outside disk 3 (the left one in FIG. 13) is driven and rotated by a drive shaft 11 via a loading cam type pressing apparatus 12. As a result, the pair of outside disks 3 supported on both end portions in the axial direction of the rotating shaft 2 are synchronously rotated while being pressed in directions toward each other. Then, the rotation of the pair of outside disks 3 is transmitted to the inside disk 8 via the power rollers 9 and taken out from the transmission gear 6.

However, it is also possible to input the power of a drive source to the inside disk 8 and take the power out from the pair of outside disks 3. In this case, the drive power of the drive source is inputted to the transmission gear 6 to drive and rotate the inside disk 8, and push the pair of outside disks 3 in a direction toward each other by the pressing apparatus 12. As a result, the rotation of the inside disk 8 is transmitted to the pair of outside disks 3 via the power rollers 9.

FIG. 14 illustrates the second example of a conventional toroidal continuously variable transmission as disclosed in JP H11-108139 A. In a toroidal continuously variable transmission 1a, an integrated inside disk 8a is supported around the middle portion in the axial direction of a rotating shaft 2a so as to be able to rotate freely by a pair of radial needle bearings 16 provided between the inner-circumferential surfaces of both end portions in the axial direction of this inside disk 8a and the outer-circumferential surface of the middle portion in the axial direction of the rotating shaft 2a. Both end portions in the axial direction of the inside disk 8a are supported inside a casing accommodating the toroidal continuously variable transmission 1a by a pair of support columns 17 and a pair of thrust angular ball bearings 18 so as to be able to rotate freely. Both ends of the pair of support columns 17 are respectively connected and fixed to an actuator body 19 and a connecting plate 20 fixed to the casing, and a pair of support plates 21 for supporting both end portions of a trunnion 10 (refer to FIG. 13) are supported on both side portions in the axial direction of the pair of support columns 17.

PRIOR ART DOCUMENTS

Patent Literatures

Patent Literature 1: JP 2004-257533 A
Patent Literature 2: JP H11-108139 A

SUMMARY OF INVENTION

Technical Problem to be Solved by the Invention

In the first example of conventional structure illustrated in FIG. 13, there is room for improvement from the aspect of improving the transmission efficiency by improving the traction coefficient of the traction portions, which are the rolling contact portions between the pair of outside surfaces in the axial direction of the inside disk 8 and the peripheral surfaces of the power rollers 9. In other words, in order to improve the transmission efficiency by improving the traction coefficient, it is necessary to suppress variation in position and surface pressure of the traction portions between the pair of side surfaces in the axial direction of the inside disk 8 and the peripheral surfaces of the power rollers 9 between pairs of cavities that exist between the inside surfaces in the axial direction of the pair of outside disks 3 and the pair of outside surfaces in the axial direction of the inside disk 8. In the first example of the conventional structure, the pair of disk elements 7 of the inside disk 8 are supported by a pair of radial needle roller bearings 13 that is provided between the inner-circumferential surfaces of the pair of disk elements 7 and the outer-circumferential surface of the rotating shaft 2 so as to be able to rotate around the rotating shaft 2. A sleeve 5 supported on the inside in the radial direction of the pair of disk elements 7 by a spline engagement so as to be able to rotate in synchronization with the pair of disk elements 7 is supported by a pair of angular ball bearings 14 so as to be able to rotate with respect to a casing that houses the toroidal continuously variable transmission 1. Then, by bringing the inside surfaces in the axial direction of the pair of disk elements 7 that face each other in contact with the outside surfaces in the axial direction of the inner rings of the pair of angular ball bearings 14 via a pair of shim plates 15, it is possible to position the pair of disk elements 7 in the axial direction. Therefore, in the first example of the conventional structure, due to the individual differences of the pair of angular ball bearings 14 and difference in preloading due to change over time, variation occurs in the amount of displacement (deformation amount) in the axial direction of the pair of disk elements 7 due to the pressing force generated by the pressing apparatus 12 during operation of the toroidal continuously variable transmission 1, and there is a possibility that the position and surface pressure of the traction portions between the pair of outside surfaces of the inner disk 8 and the peripheral surfaces of the power rollers 9 between the pair of cavities may vary.

On the other hand, in the second example of conventional structure illustrated in FIG. 14, a configuration is adopted in which an integrated inside disk 8*a* is used and the inside disk 8*a* is supported by a pair of thrust angular ball bearings 18, so during operation of the toroidal continuously variable transmission 1*a*, regardless of a pressing force generated by a hydraulic pressing apparatus 12*a*, it is possible to suppress variation in the position and the surface pressure of the traction portions between the pair of outside surfaces in the axial direction of the inside disk 8*a* and the peripheral surfaces of the plurality of power rollers 9 between a pair of cavities existing on both sides in the axial direction the inside disk 8*a*. However, in the second example of the conventional structure, since both end portions of the inside disk 8*a* are supported by the pair of thrust angular ball bearings 18 so as to be able to rotate with respect to the pair of support columns 17, the dimension in the axial direction of the portion that supports the inside disk 8*a* so as to be able rotate increases, which is disadvantageous from the aspect of reducing the size of the toroidal continuously variable transmission 1*a*.

In consideration of the situation described above, an object of the present invention is to achieve construction of a toroidal continuously variable transmission that can be easily made to be more compact while at the same time maintain transmission efficiency.

Means for Solving the Problems

The toroidal continuously variable transmission of the present invention comprises a rotating shaft, a pair of outside disks, an inside disk, a pair of rolling bearing units, a plurality of power rollers, and a pair of preloading mechanisms.

Each of the pair of outside disks has an inside surface in the axial direction having an arc shaped cross section and is supported with respect to the rotating shaft so as to be able to rotate in synchronization with the rotating shaft.

The inside disk has a pair of outside surfaces in the axial direction having an arc shaped cross section that face the inside surfaces in the axial direction of the pair of outside disks, and that is supported with respect to the rotating shaft so as to be able to rotate relative to the rotating shaft.

Each of the pair of rolling bearing units includes a radial rolling bearing capable of supporting an axial load and comprising an outer ring, an inner ring, and a plurality of rolling bodies arranged between the outer ring and the inner ring, and is arranged on the inside in the radial direction of the inside disk so as to support the inside disk so that relative rotation with respect to the rotating shaft is possible.

The plurality of power rollers are arranged between the inside surfaces in the axial direction of the pair of outside disks and the pair of outside surfaces in the axial direction of the inside disk so as to be able to transmit power between the pair of outside disks and the inside disk.

The preloading mechanism elastically presses the outer ring or the inner ring of the radial rolling bearing in the axial direction.

The inside disk can be entirely integrated, or can be a combination of a pair of disk elements.

Each of the pair of rolling bearing units can be configured as a combination of a plurality of rolling bearings that include the radial rolling bearing, or can be configured as only the radial rolling bearing.

The preloading mechanism can be configured by an elastic member that is sandwiched and held between an end surface in the axial direction of the outer ring or the inner ring, and a stepped surface that is provided directly on or by way of another member on a sleeve that is arranged around the inside disk or the rotating shaft so as to face the end surface in the axial direction of the outer ring or the inner ring.

A gap in the radial direction can be provided between the outer-circumferential surface of the outer ring and the inner-circumferential surface of the inside disk facing the outer-circumferential surface of the outer ring, or between the inner-circumferential surface of the inner ring and the outer-circumferential surface of the sleeve facing the inner-circumferential surface of the inner ring. The dimension in the radial direction of the gap in the radial direction can be set to a size making it possible to prevent excessive preloading of the pair of radial rolling bearings regardless of the elastic deformation of the inside disk that occurs during operation of the toroidal continuously variable transmission.

Effect of the Invention

With the present invention, a construction of a toroidal continuously variable transmission is provided that can easily be made more compact while maintaining the transmission efficiency and durability.

In other words, the inside disk is supported with respect to the rotating shaft by a pair of rolling bearing units that is arranged on the inside in the radial direction of the inside disk so that relative rotation with respect to the rotating shaft is possible, so both end portions in the axial direction of the inside disk can be easily made more compact in comparison with construction of supporting the inside disk by a pair of thrust angular ball bearings so as to be able to rotate freely as in the second example of conventional construction illustrated in FIG. 14.

The preloading mechanisms apply a preload in the axial direction to the radial rolling bearings of a pair of rolling bearing units by elastically pressing the outer ring or the inner ring of the radial rolling bearings in the axial direction. Therefore, even in the case where a difference in dimensions occurs between the radial rolling bearings of the pair of rolling bearing units due to individual differences or changes over time, it is possible to absorb the differences, and thus it is possible to maintain the preloading of the radial rolling bearings to a proper value. Consequently, it is possible to suppress variation in the amount of deformation of the pair of outside surfaces in the axial direction of the inside disk, so it is possible to maintain the transmission efficiency of the toroidal continuously variable transmission.

In addition, it is possible to absorb loads that would be inputted to the pair of radial rolling bearings due to deformation of the inside disk during operation of the toroidal continuously variable transmission, so it is possible to prevent excessive preloading of the radial rolling bearings, it is possible to prevent the surface pressure at the areas of contact of the radial rolling bearings from becoming uneven in the circumferential direction, and it is possible to maintain the durability of the radial rolling bearings, and thus it is possible to maintain the durability of the toroidal continuously variable transmission.

MODE FOR CARRYING OUT THE INVENTION

First Example

Figure 1:
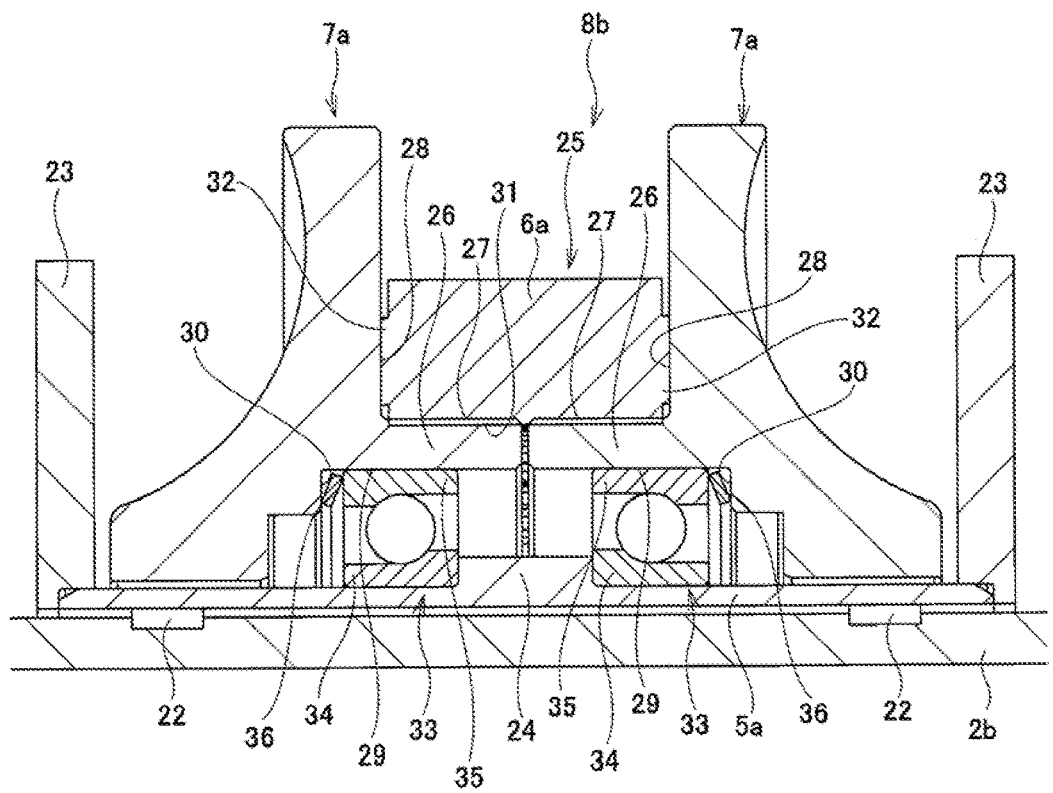
FIG. 1 is a cross-sectional view of the first example of an embodiment of the present invention, and illustrates a removed inside disk and a portion that supports the inside disk so as to be able to rotate with respect to a rotating shaft and a casing.
Figure 13:
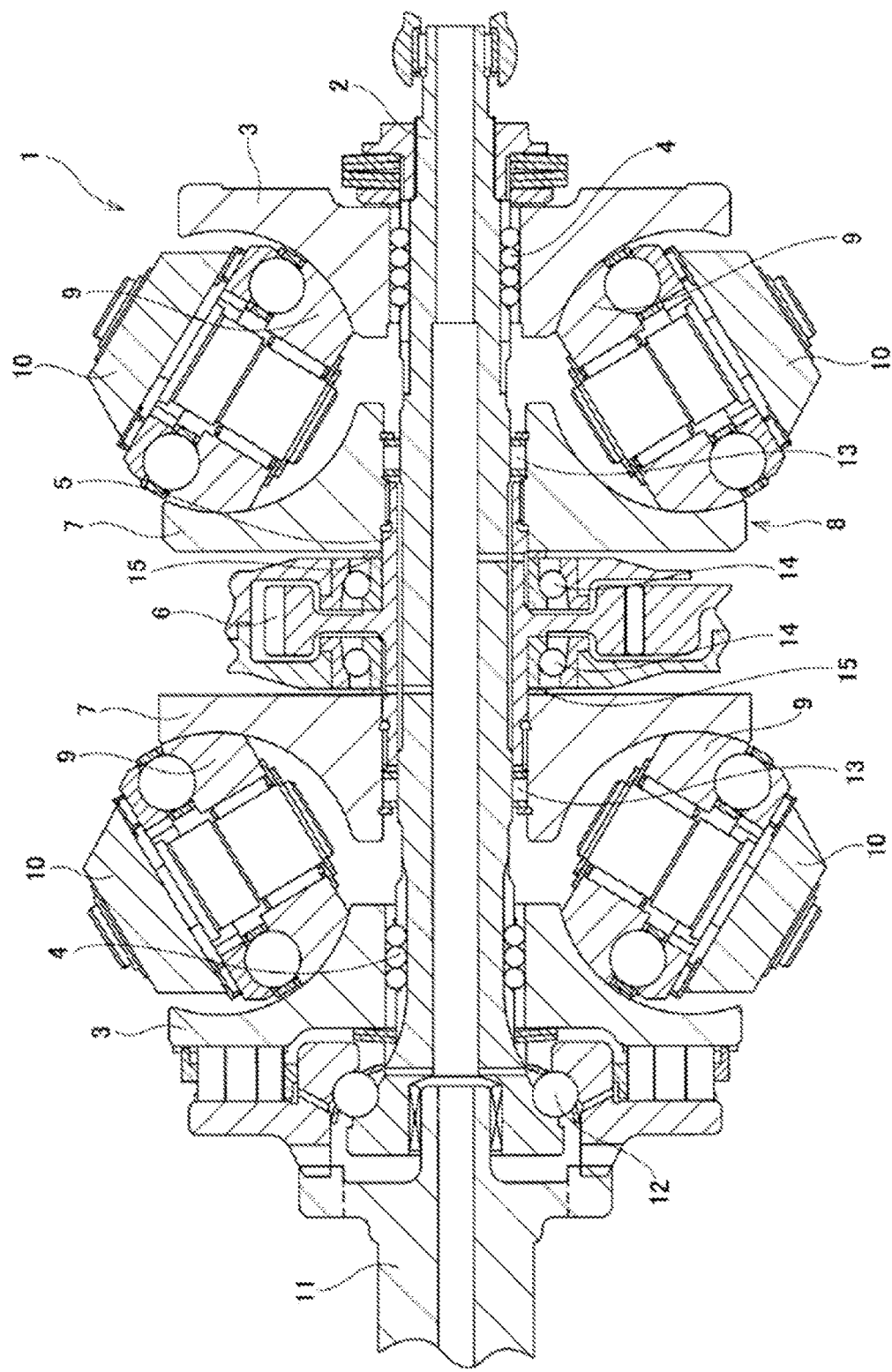
FIG. 13 is a cross-sectional view illustrating the first example of a conventional toroidal continuously variable transmission.

FIG. 1 illustrates the first example of an embodiment of the present invention. The toroidal continuously variable transmission of this example comprises a rotating shaft 2b, a pair of outside disks 3 (see FIG. 14), an inside disk 8b, and a plurality of power rollers 9. The pair of outside disks 3 are supported around both end portions in the axial direction of the rotating shaft 2b with the inside surfaces in the axial direction, which are toroidal curved surfaces, facing each other, so as to be able to move in a direction toward or away from each other, and so as to be able to rotate in synchronization with the rotating shaft 2b. The inside disk 8b is supported around the rotating shaft 2b with the pair of outside surfaces in the axial direction, which are toroidal curved surfaces, respectively facing the inside surfaces in the axial direction of the pair of outside disks 3, so as to be able to rotate relative to the rotating shaft 2b. The power rollers 9 is arranged so as to be sandwiched and held in a pair of cavities (two locations in the axial direction) between the inside surfaces in the axial direction of the pair of outside disks 3 and the pair of outside surfaces in the axial direction of the inside disk 8b, and the peripheral surface of each power rollers 9, which is a spherical convex surface, comes in rolling contact with one of the inside surfaces in the axial direction of the pair of outside disks 3 and with one of the pair of outside surfaces in the axial direction of the inside disk 8b that faces the one inside surface in the axial direction. The power rollers 9 are rotatably supported by respective support members. The support members are supported by a casing or a member that is fixed to a casing so as to be able to pivotally move around a pivot shaft that is located in a skewed position with respect to the center axis of the pair of outside disks 3 and the inside disk 8b. As the support member, it is possible, for example, a trunnion 10 such as illustrated in FIG. 13 can be used.

Figure 14:
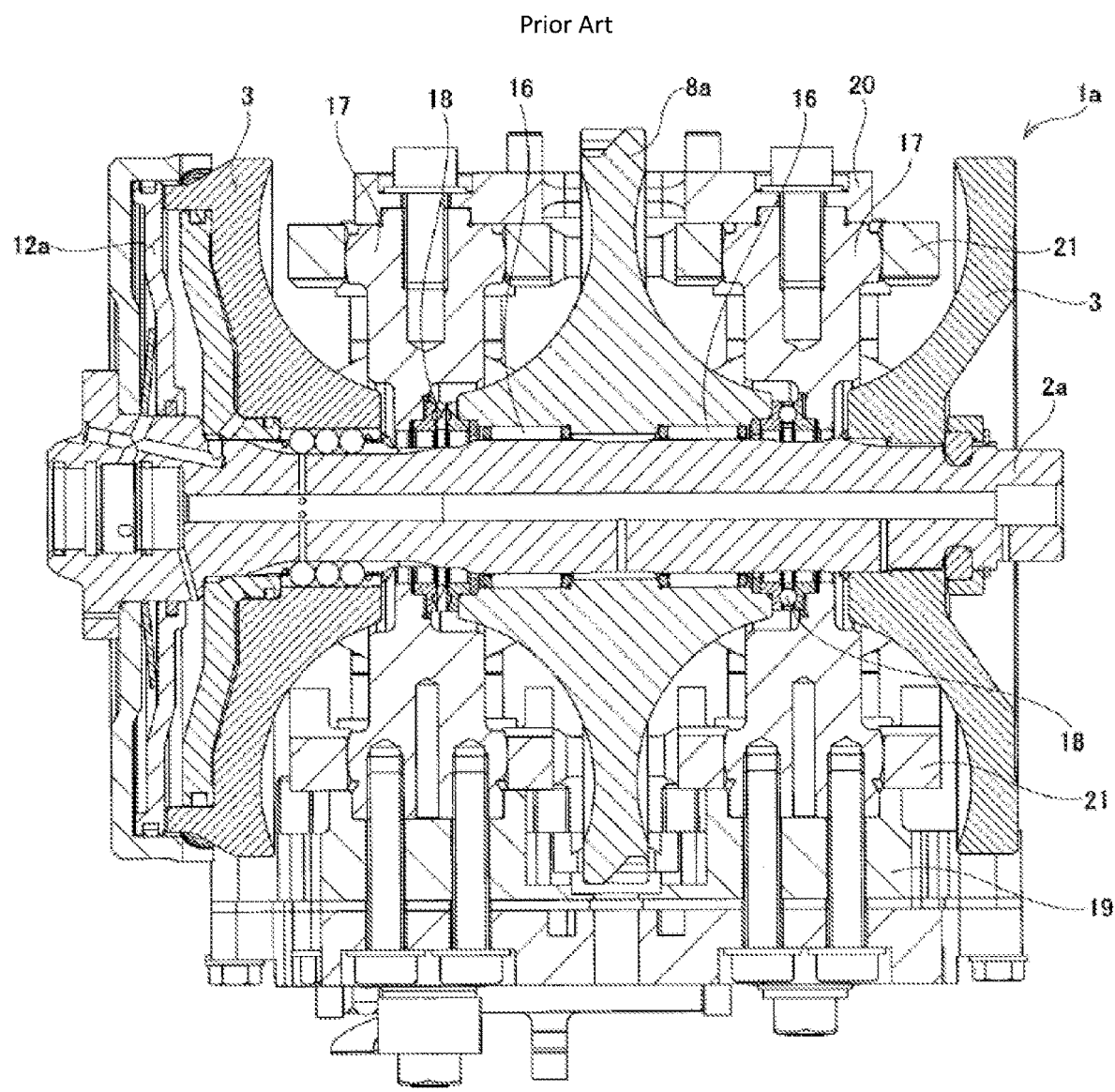
FIG. 14 is a cross-sectional view illustrating the second example of a conventional toroidal continuously variable transmission.

During the operation of the toroidal continuously variable transmission, as the rotating shaft 2b is being driven and rotated, a hydraulic pressing apparatus 12a (refer to FIG. 14) presses one of the outside disks 3 (the left one in FIG. 14) of the pair of outside disks 3 in a direction toward the other outside disc 3 (the right one in FIG. 14). As a result, the pair of outside disks 3 rotate in synchronization with each other while being pressed in a direction toward each other. Then, the rotation of the pair of outside disks 3 is transmitted to the inside disk 8b via the power rollers 9, and taken out from the transmission gear 6a provided around the circumferential surface of the middle portion of the inside disk 8b. However, configuration is also possible in which driving power of a drive source is inputted to the inside disk 8b and taken out from the pair of outside disks 3.

In the present example, the sleeve 5a is supported around the middle portion in the axial direction of the rotating shaft 2b in a state so as to be able to rotate relative to the rotating shaft 2b, and so that rotation with respect to the casing that houses the toroidal continuously variable transmission is prevented. In other words, the rotating shaft 2b is supported on the inside in the radial direction of the sleeve 5a that is supported in a state in which rotation with respect to the casing is prevented, and is supported so as to be able to rotate relative to the sleeve 5a. A pair of radial needle bearings 22 is provided between both side portions in the axial direction of the inner-circumferential surface of the sleeve 5a and the outer-circumferential surface of the rotating shaft 2b, and both end portions in the axial direction of the sleeve 5a are supported by and fixed to the casing via a pair of support members 23 that is supported in a state in which relative rotation with respect to the sleeve 5a is prevented. An outward-facing flange portion 24 that protrudes outward in the radial direction is provided around the middle portion in the axial direction of the outer-circumferential surface of the sleeve 5a.

In this example, the inside disk 8b is configured by a combination of a pair of disk elements 7a and a ring-shaped member 25. The pair of disk elements 7a has the outside surfaces in the axial direction that face the inside surfaces in the axial direction of the pair of outside disks 3 and are toroidal curved surfaces having an arc shape in the cross section. On the inside end portion in the axial direction of each of the pair of disk elements 7a, a small-diameter portion 26 having an outer diameter that is smaller than the outer diameter of the middle portion in the axial direction thereof is provided. The outer-circumferential surface of the small-diameter portion 26 functions as a male spline portion 27. The outer-circumferential surface of the middle portion in the axial direction of each of the disk elements 7a and the outer-circumferential surface of the small-diameter portion 26 are continuous by an outer-diameter-side stepped surface 28 that faces inward in the axial direction. On an inside half portion in the axial direction of the inner-circumferential surface of each of the pair of disk elements 7a, a mating surface portion 29 having an inner diameter that is larger than the inner diameter of an outside half portion in the axial direction is provided. The inner-circumferential surface of the outside half portion in the axial direction of each of the disk element 7a and the mating surface portion 29 are continuous by an inner-diameter side stepped surface 30 that faces inward in the axial direction. The ring-shaped member 25 has a transmission gear 6a that is provided around the outer-circumferential surface and a female spline portion 31 that engages with the male spline portions 27 of the pair of disk elements 7a and is provided around inner-circumferential surface. Furthermore, the ring-shaped member 25 has annular convex portions 32 on both end surfaces in the axial direction. The ring-shaped member 25 positions the relative positions of the pair of disk elements 7a by butting the tip-end surfaces of the convex portions 32 against the outer-diameter side stepped surfaces 28 of the pair of disk elements 7a, or in other words, adjusts the space between the inside surfaces of the pair of disk elements 7a. Moreover, the female spline portion 31 of the ring-shaped member 25 engages with the male spline portions 27 of the pair of disk elements 7a.

In this example, each of the pair of bearing units for supporting the inside disk 8b with respect to the rotating shaft 2b is configured only by a radial rolling bearing capable of supporting an axial load. More specifically, the inside disk 8b is supported by a pair of radial angular ball bearings 33 that has contact angles that are oriented in different directions from each other, or in other words, has a face-to-face arrangement of contact angles, around the sleeve 5a so as to be able to rotate relative to the rotating shaft 2b and the sleeve 5a. The inner rings 34 of the pair of ball bearings 33 are fitted onto the sleeve 5a with an interference fit in a state such that the inside end surfaces in the axial direction thereof come in contact with both side surfaces in the axial direction of the outward-facing flange portion of the sleeve 5a. On the other hand, the outer rings 35 of the pair of ball bearings 33 are fitted into the mating surface portions 29 of the pair of disk elements 7a with a clearance fit. However, configuration is also possible in which the inner rings 34 are fitted onto the sleeve 5a with a clearance fit and the outer rings 35 are fitted into the mating surface portions 29 with an interference fit.

The toroidal continuously variable transmission of this example includes a preloading mechanism that applies a preload in the axial direction to the pair of ball bearings 33 by pressing the outer rings 35 of the pair of ball bearings 33 in a direction toward each other in the axial direction (inward in the axial direction). The preloading mechanism is configured by sandwiching and holding a pair of elastically deformed (elastically compressed) truncated cone shaped disk springs 36 between the outside end surfaces in the axial direction of the outer rings 35 and the inner-diameter side stepped surfaces 30 of the pair of disk elements 7a. In other words, in this example, the pair of disk springs 36 form elastic members, and the inner-diameter side stepped surfaces 30 of the pair of disk elements 7a form stepped surfaces. Then, preloading in the axial direction is applied to the pair of ball bearings 33 by the pair of disk springs 36 elastically pressing the outer rings 35 in a direction inward in the axial direction (direction toward each other).

The toroidal continuously variable transmission of this example can easily be made more compact while maintaining the transmission efficiency and durability. In other words, the inside disk 8b is supported by a pair of ball bearings 33 that are arranged on the inside in the radial direction of the inside disk 8b so that relative rotation with respect to the rotating shaft 2b is possible, so it is possible to make the toroidal continuously variable transmission more compact as compared with construction in which the both end portions in the axial direction of the inside disk 8a are supported by a pair of thrust angular ball bearings 18 so as to be able to rotate freely as in the case of the second example of conventional construction as illustrated in FIG. 14.

Figure 2:
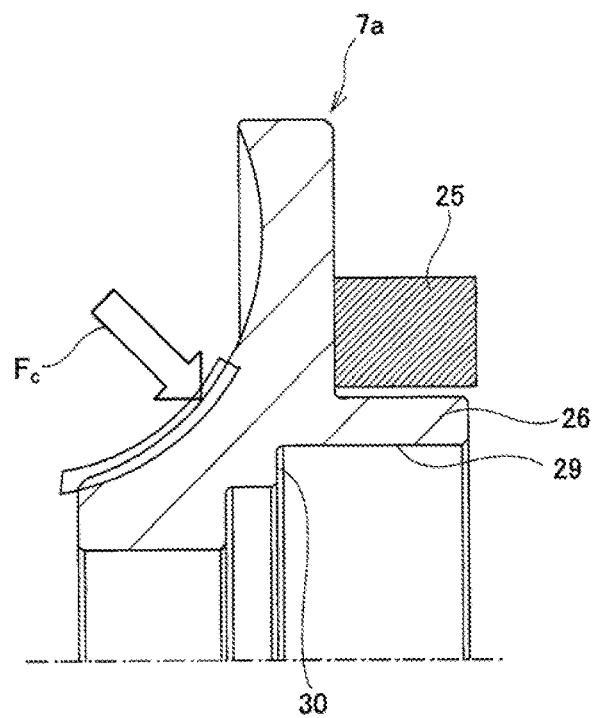
FIG. 2 is a cross-sectional view of the first example of an embodiment of the present invention, and explains the problem in the case of supporting the inner disk by a radial rolling bearing that is arranged on the inside in the radial direction of the inside disk so that the inside disk is able to rotate freely.

The preloading mechanism elastically presses the outer rings 35 of the pair of ball bearings 33 in a direction inward in the axial direction to apply a preload in the axial direction to the pair of ball bearings 33. Therefore, for example, even in the case where a difference in dimensions occurs between the pair of ball bearing 33 due to differences in rolling bodies or changes over time, the elastic deformation of the disk springs 36 makes it possible to absorb the difference, so it is possible to maintain the preloading of the pair of ball bearings 33 at a proper value. As a result, during operation of the toroidal continuously variable transmission, it is possible to suppress variation in the amount of deformation of the pair of ball bearings 33 due to the pressure force generated by the pressing apparatus 12a, so variation in the amount of deformation of the pair of disk elements 7a that are supported by the pair of ball bearings 33 so as to be able to rotate freely is suppressed. Therefore, between the pair of cavities that exist between the inside surfaces in the axial direction of the pair of outside disks 3 and the pair of outside surfaces in the axial direction of the inside disk 8b, variation in the location of traction and the surface pressure between the pair of outside surfaces in the axial direction of the inside disk 8b and the peripheral surfaces of the power rollers 9 is suppressed, making it possible for good transmission efficiency of the toroidal continuously variable transmission. Furthermore, during operation of the toroidal continuously variable transmission, it is possible to prevent the preloading of the pair of ball bearings 33 from becoming excessively large, and durability of the pair of ball bearings 33 can be maintained well, so the durability of the toroidal continuously variable transmission can be maintained well. The reason for this will be explained with reference to FIG. 2 and FIG. 3 in addition to FIG. 1.

Figure 3:
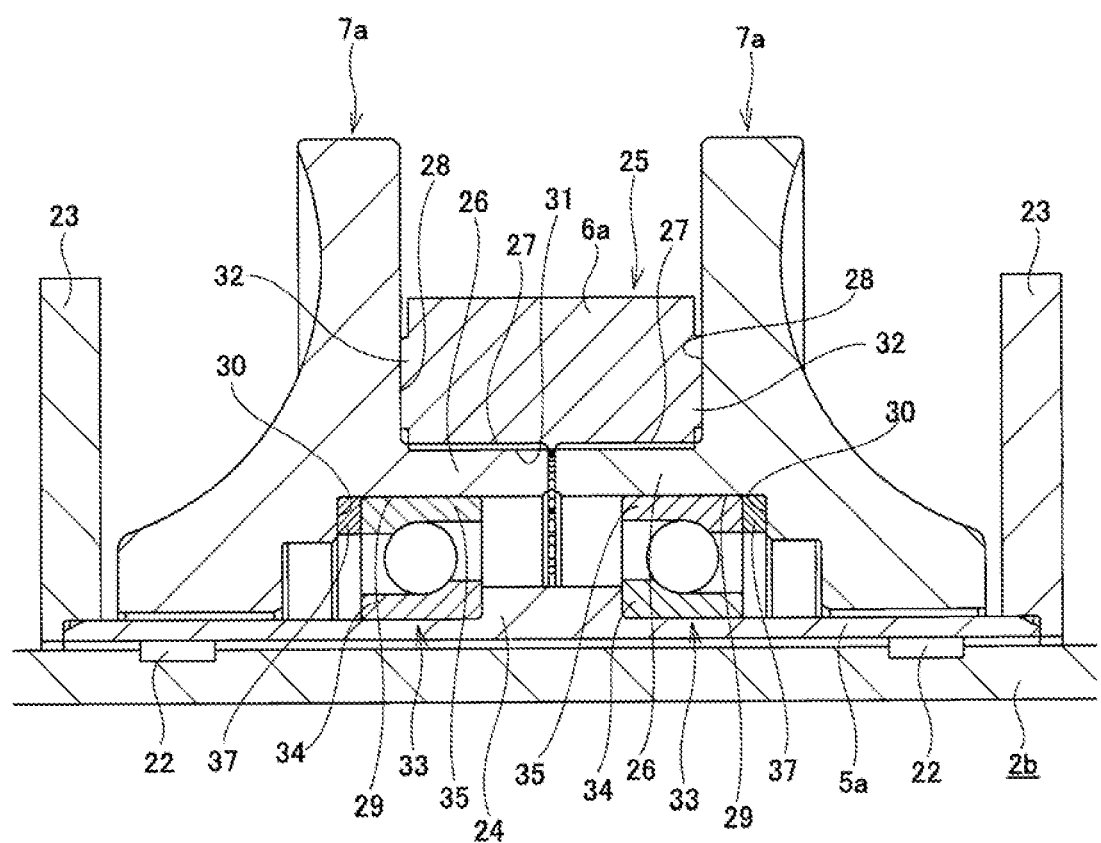
FIG. 3 is a view similar to FIG. 1 for explaining the problem in the case of using a shim plate to perform preload adjustment in the axial direction of a ball bearing for supporting the inside disk so as to be able to rotate freely.

In other words, during operation of the toroidal continuously variable transmission, due to the pressure force generated by the pressing apparatus 12a, the force (normal force) Fc that is applied to the pair of disk elements 7a of the inside disk 8b becomes at most several tens of kN (several tf), and due to this force Fc, the pair of disk elements 7a elastically deform (about several tenths of a millimeter) with the point of contact with the tip-end surface of each of the convex portions 32 of the ring shaped member 25 as a fulcrum. In the case where the peripheral surfaces of the power rollers 9 come in rolling contact with the inside half portion in the radial direction of the pair of outside surfaces in the axial direction of the inside disk 8b, the inner-diameter side stepped surfaces 30 of the pair of disk elements 7a elastically deforms in a direction inward in the axial direction. This kind of elastic deformation of the pair of disk elements 7a becomes a maximum in the case where the peripheral surfaces of the power rollers 9 come in rolling contact with the small-diameter side end portions of the outside surfaces in the axial direction of the pair of disk elements 7a. Therefore, as illustrated in FIG. 3, when using a pair of shim plates 37 to perform preload adjustment of the pair of ball bearings 33 that support the pair of disk elements 7a so as to be able to rotate, there is a possibility that the preloading of the ball bearings 33 will become excessively large. Furthermore, the amount of elastic deformation of the pair of disk elements 7a becomes larger in the phase where the power rollers 9 exist than in the phase where the power rollers 9 do not exist with respect to the circumferential direction. Therefore, when preload adjustment of the pair of ball bearings 33 is performed using a pair of shim plates 37, the preloading of the ball bearings 33 becomes uneven in the circumferential direction, and there is a possibility that the rolling body load that is applied to the inner-ring raceway and outer-ring raceway of each ball bearing 33 will also become uneven in the circumferential direction. Moreover, in the case of difference in the thermal expansion coefficient of the material of the inside disk 8b, the pair of ball bearings 33, the sleeve 5a, and the pair of shim plates 37, or in the case where the temperature change of these members occurs, there is a possibility that a dimensional change will occur in the toroidal continuously variable transmission between the time of assembly and the time of operation. Therefore, when preload adjustment of the pair of ball bearings 33 is performed using the shim plates 37, there is a possibility that the preloading of the ball bearings 33 will become excessively large due to thermal expansion of the components of the toroidal continuously variable transmission during operation of the toroidal continuously variable transmission. Due to the reason described above, when preload adjustment of the pair of ball bearings 33 is performed using a pair of shim plates 37, there is a possibility that the bearing life of the pair of ball bearings 33 will be remarkably reduced.

On the other hand, in the toroidal continuously variable transmission of this example, preload adjustment of the pair of ball bearings 33 is performed by the pair of disk springs 36 sandwiched and held between the outside surface in the axial direction of the outer rings 35 of the pair of ball bearings 33 and the inner-diameter side stepped surfaces 30 of the pair of disk elements 7a. Therefore, even in the case where the inner-diameter side stepped surfaces 30 of the pair of disk elements 7a elastically deforms in a direction inward in the axial direction, the elastic deformation of the pair of disk elements 7a can be absorbed by the elastic deformation of the disk springs 36, so it is possible to prevent the preloading of the ball bearings 33 from becoming excessively large. Moreover, the rolling load that is applied to the inner-ring raceway and the outer-ring raceway of each of the pair of ball bearings 33 can be made mostly uniform in the circumferential direction. Furthermore, during operation of the toroidal continuously variable transmission, it is possible to absorb the thermal expansion of the components of the toroidal continuously variable transmission. In addition, in this example, the outer rings 35 are fitted with a clearance fit inside the mating surface portions 29 of the pair of disk elements 7a, so during operation of the toroidal continuously variable transmission, even in the case where at least one of the pair of disk elements 7a elastically deforms in a diameter reducing direction due to the pressure force generated by the pressing apparatus 12a, it is possible to prevent the preloading of at least one of the pair of ball bearings 33 from becoming excessively large. Therefore, with the toroidal continuously variable transmission of this example, it is possible to sufficiently maintain the bearing life of the pair of ball bearings 33.

Second Example

Figure 4:
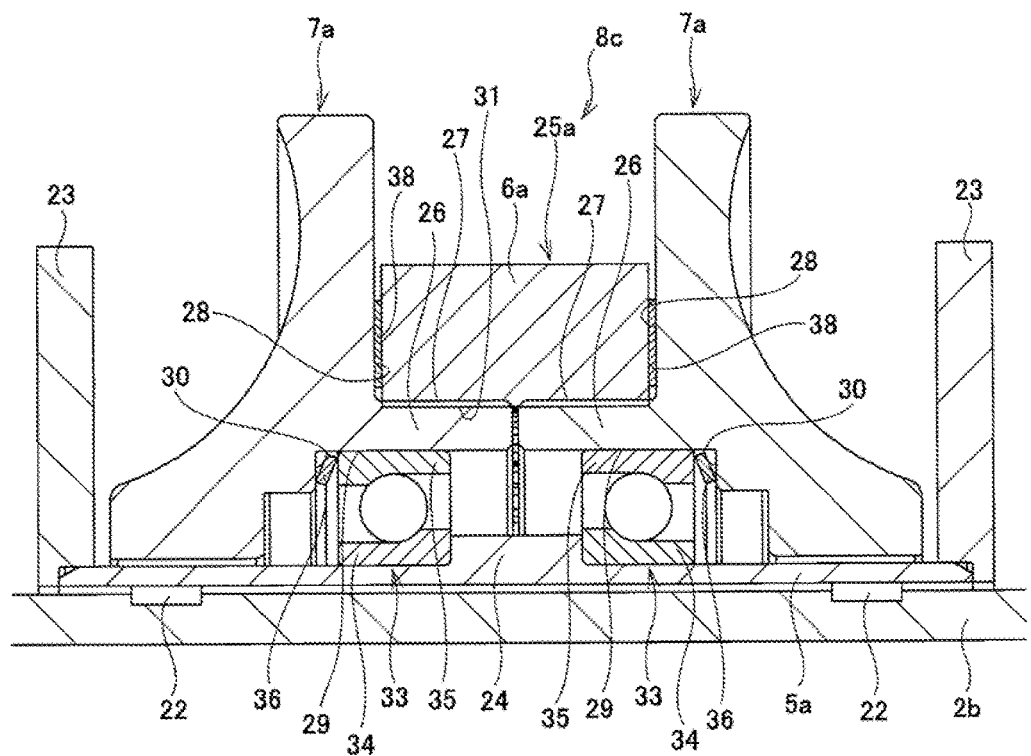
FIG. 4 is a view similar to FIG. 1 and illustrates the second example of an embodiment of the present invention.

FIG. 4 illustrates the second example of an embodiment of the present invention. In this example, both end surfaces in the axial direction of the ring-shaped member 25a of the inside disk 8c are annular flat surfaces. Instead, by sandwiching and holding a pair of shim plates 38 in the portions between the both end surfaces in the axial direction of the ring-shaped member 25a and the outer-diameter side stepped surfaces 28 of the pair of disk elements 7a, it is possible to position the relative positions of the pair of disk elements 7a, or in other words, it is possible to adjust the space between the outside surfaces in the axial direction of pair of disk elements 7a. The configuration and function of the other portions are the same as in the first example of an embodiment of the present invention.

Third Example

Figure 5:
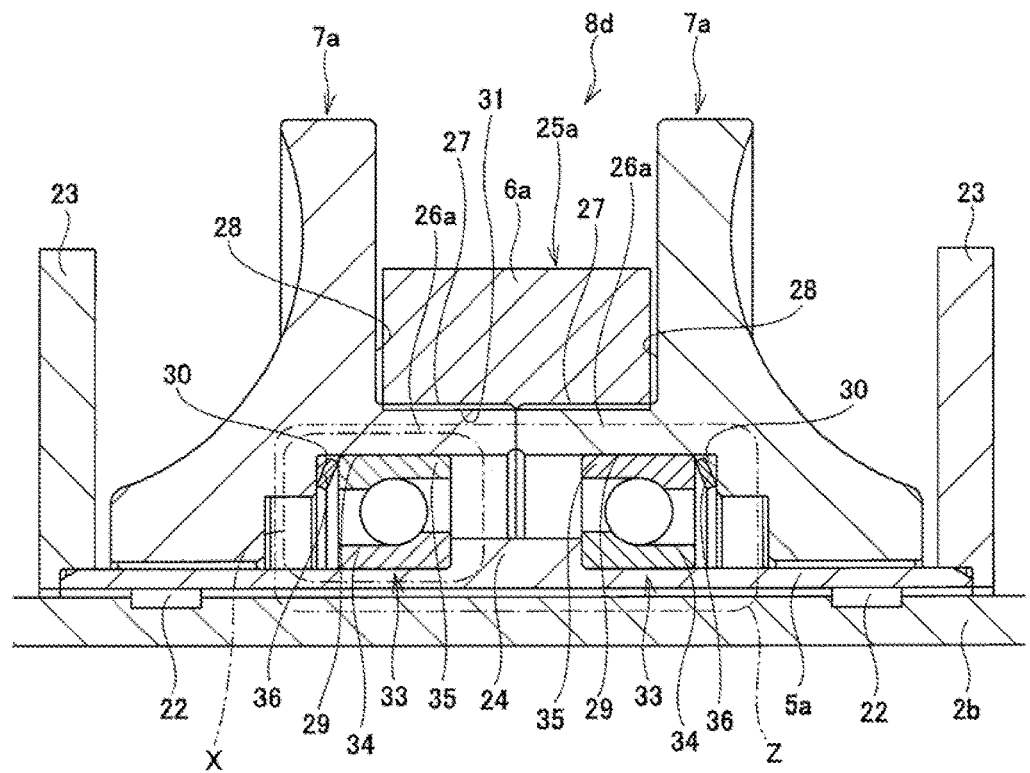
FIG. 5 is a view similar to FIG. 1 and illustrates the third example of an embodiment of the present invention.

FIG. 5 illustrates the third example of an embodiment of the present invention. In this example, by bringing the inside end surfaces in the axial direction of the pair of disk elements 7a of the inside disk 8d into contact with each other, it is possible to position the relative positions of the pair of disk elements 7a. The configuration and function of the other portions are the same as in the first example of an embodiment of the present invention.

Fourth Example

Figure 6:
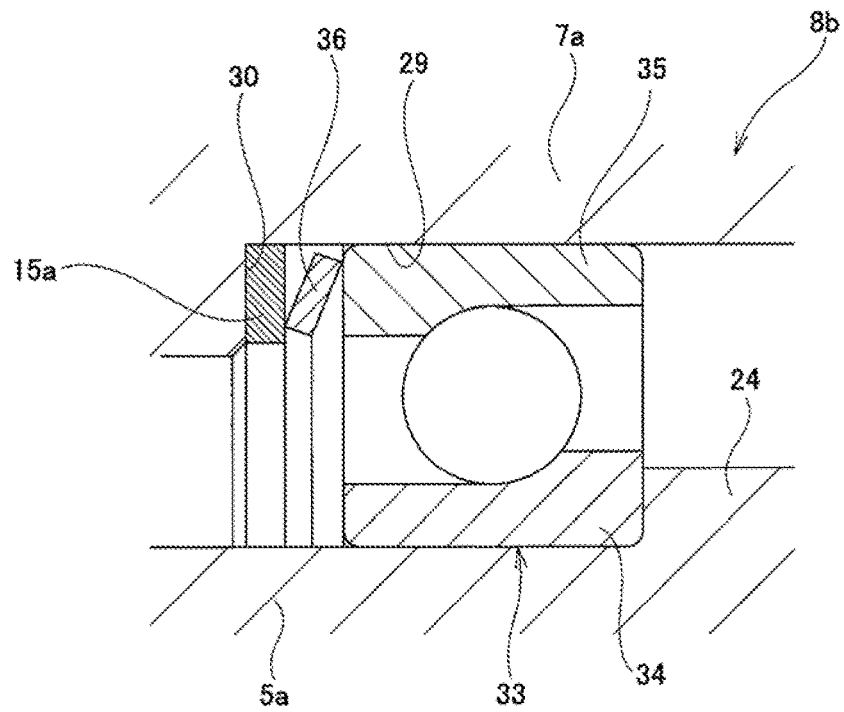
FIG. 6 illustrates the fourth example of an embodiment of the present invention, and corresponds to an enlarged view of portion X in FIG. 5.

FIG. 6 illustrates the fourth example of an embodiment of the present invention. In this example, the preloading mechanism that applies a preload in the axial direction to the pair of ball bearings 33 is configured by sandwiching and holding shim plats 15a and disk springs 36 between the inner-diameter side stepped surfaces 30 of the pair of disk elements 7a of the inside disk 8b and the outside end surfaces in the axial direction of the outer rings 35 of the pair of ball bearings 33. In other words, the outside surfaces in the axial direction of the shim plates 15a come in contact with the inner-diameter side stepped surfaces 30 of the disk elements 7a, and the disk springs 36 are sandwiched and held in an elastically deformed state between the inside surfaces in the axial direction of the shim plates 15a and the outside end surfaces in the axial direction of the outer rings 35 of the pair of ball bearings 33. Then, the disk springs 36 elastically press the outer rings 35 in a direction inward in the axial direction to apply a preload in the axial direction to the ball bearings 33. The configuration and function of the other portions are the same as in the first example of an embodiment of the present invention.

Fifth Example

Figure 7:
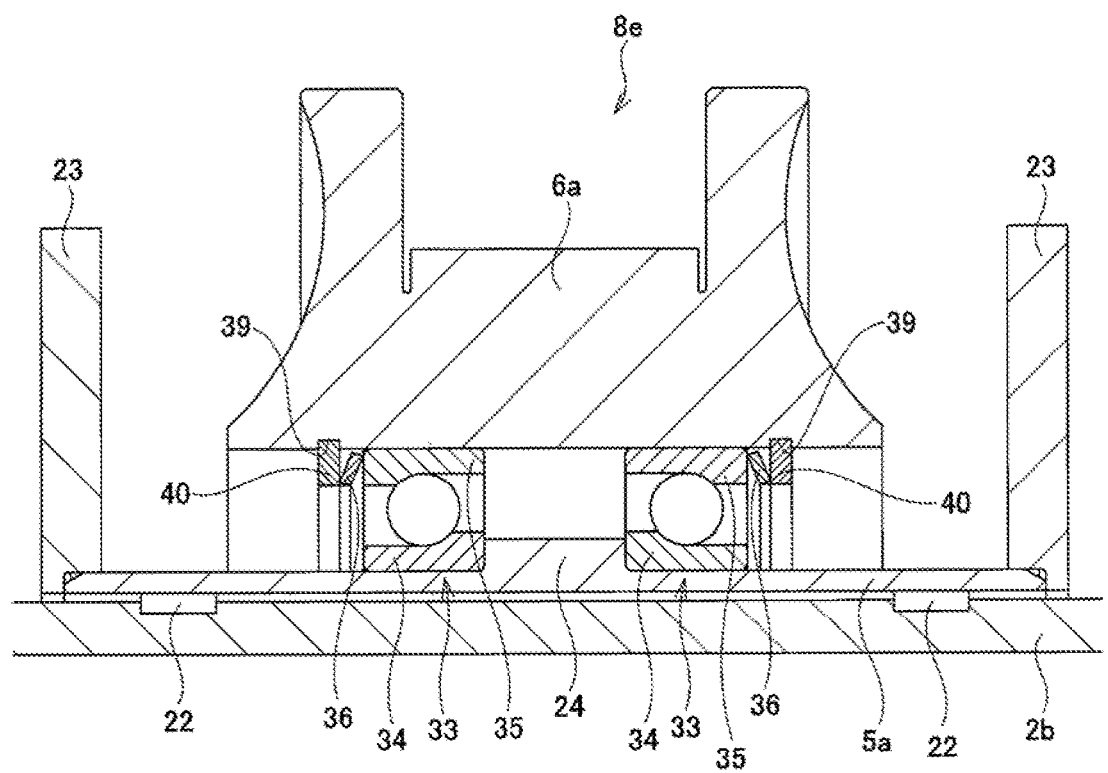
FIG. 7 is a view similar to FIG. 1 and illustrates the fifth example of an embodiment of the present invention.

FIG. 7 illustrates the fifth example of an embodiment of the present invention. In this example, an inside disk 8e is integrally formed as a whole. In other words, toroidal curved surfaces having an arc shape in the cross section are formed on the pair of outside surfaces in the axial direction of the inside disk 8e, and a transmission gear 6a is provided around the outer-circumferential surface of the middle portion in the axial direction having an outer diameter that is smaller than the outer diameter of the both side portions in the axial direction thereof. A pair of locking grooves 39 are provided in the circumferential direction on both side portions in the axial direction of the inner-circumferential surface of the inside disk 8e. Except for where the pair of locking grooves 39 are formed, the inner diameter of the inner-circumferential surface of the inside disk 8e does not change in the axial direction, and is a simple cylindrical surface.

The inside disk 8e is supported by a pair of face-to-face combination ball bearings 33 around a sleeve 5a that is supported in a state in which rotation with respect to a casing that houses the toroidal continuously variable transmission is prevented so that relative rotation with respect to a rotating shaft 2b and the sleeve 5a is possible. In other words, in a state in which the inside end surfaces in the axial direction of the inner rings 34 of the pair of ball bearings 33 come in contact with both side surfaces in the axial direction of an outward facing flange portion 24 that is provided around the middle portion in the axial direction of a sleeve 5a, the inner rings 34 are fitted onto the sleeve 5a with an interference fit, and the outer rings 35 of the pair of ball bearings 33 are fitted into the inner-circumferential surface of the inside disk 8e with a clearance fit. Then, a pair of disk springs 36 having a truncated cone shape in the cross section are sandwiched and held in an elastically deformed state in between the outside end surface in the axial direction of the outer rings 35 of the pair of ball bearings 33 and the inside surfaces in the axial direction of a pair of locking rings 40 that are locked to the pair of locking grooves 39 so as to elastically press the outer ring 35 inward in the axial direction. As a result, a preloading mechanism that applies a preload in the axial direction to the pair of ball bearings 33 is configured. Incidentally, in this example, stepped surfaces are configured by the inside surfaces in the axial direction of the pair of locking rings 40. The configuration and function of the other portions are the same as in the first example of an embodiment of the present invention.

Sixth Example

Figure 8:
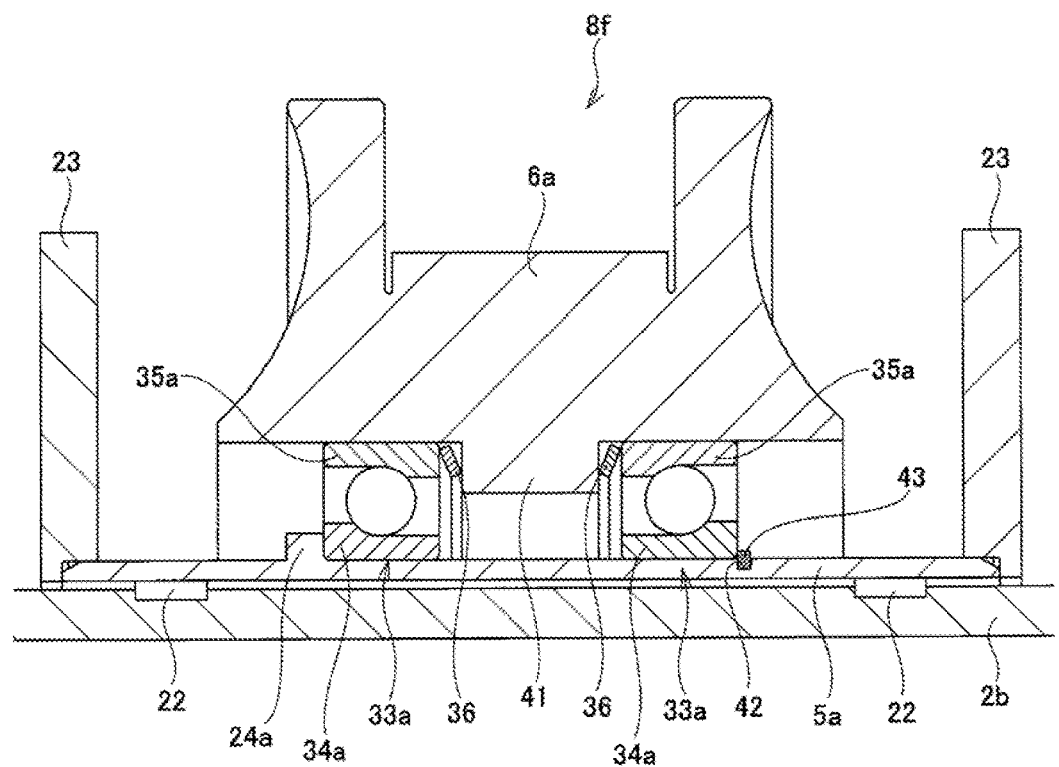
FIG. 8 is a view similar to FIG. 1 and illustrates the sixth example of an embodiment of the present invention.

FIG. 8 illustrates the sixth example of an embodiment of the present invention. In this example, an integrated inside disk 8f is supported by a pair of back-to-back combination ball bearings 33a around a sleeve 5f so that relative rotation with respect to the sleeve 5a and the rotating shaft 2b is possible. An inward facing flange portion 41 is provided around the middle portion in the axial direction of the inner-circumferential surface of the inside disk 8f. An outward facing flange portion 24a is provided in a portion near one end in the axial direction of the sleeve 5a (portion near the left end in FIG. 8), and a locking groove 42 is provided around the entire circumference of a portion near the other end in the axial direction of the sleeve 5a (portion near the right end in FIG. 8). Of the pair of ball bearings 33a, the outside end surface in the axial direction of the inner ring 34a of a ball bearing 33a on one side in the axial direction comes in contact with the other side surface in the axial direction of the outward-facing flange portion 24a of the sleeve 5a, and in this state, the inner ring 34a of the ball bearing 33a on the one side in the axial direction is fitted onto the portion near the one end in the axial direction of the sleeve 5a with an interference fit. Moreover, the outer ring 35a of the ball bearing 33a on the one side in the axial direction is fitted into the portion on the one side in the axial direction of the inner-circumferential direction of the inside disk 8f with a clearance fit. A disk spring 36 having a truncated cone shape in the cross section is sandwiched and held in an elastically deformed state between the one side surface in the axial direction of the inward-facing flange portion 41 of the inside disk 8f and the inside end surface in the axial direction of the outer ring 35a of the ball bearing 33a on the one side in the axial direction.

Of the pair of ball bearings 33a, the outer ring 35a of the ball bearing 33a on the other side in the axial direction is fitted into a portion on the other side in the axial direction of the inner-circumferential surface of the inside disk 8f. Moreover, the inner ring 34a of the ball bearing 33a on the other side in the axial direction is fitted onto the portion on the other end in the axial direction of the sleeve 5a, and a locking ring 43 that is locked in the locking groove 42 of the sleeve 5a comes in contact with the outside end surface in the axial direction of this inner ring 34a. A disk spring 36 having a truncated cone shape in the cross section is sandwiched and held in an elastically deformed state between the other side surface in the axial direction of the inward facing flange portion 41 of the inside disk 8f and the inside end surface in the axial direction of the outer ring 35a of the ball bearing 33a on the other side in the axial direction. With this kind of configuration, the pair of disk springs 36 elastically press the outer rings 35a in an outward direction in the axial direction, and a preloading mechanism that applies a preload in the axial direction to the pair of ball bearings 33a is configured. Incidentally, in this example, stepped surfaces are configured by both side surfaces in the axial direction of the inward-facing flange portion 41. The configuration and function of the other portions are the same as in the first example and fifth example of an embodiment of the present invention.

Seventh Example

Figure 9:
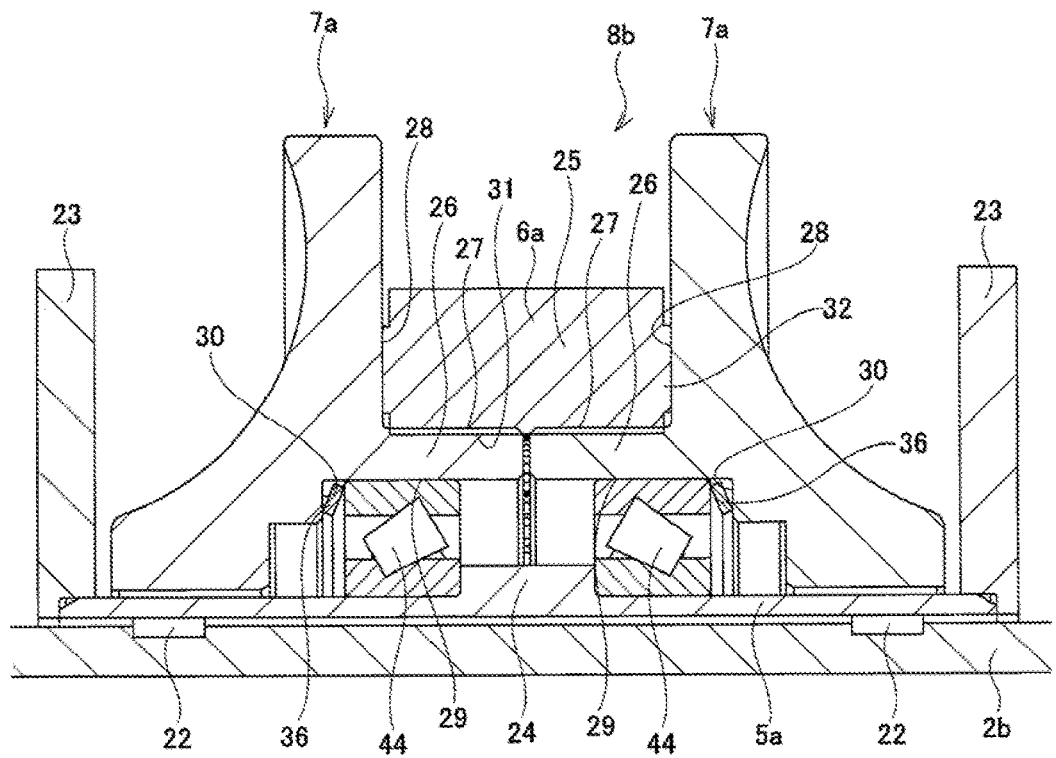
FIG. 9 is a view similar to FIG. 1 and illustrates the seventh example of an embodiment of the present invention.

FIG. 9 illustrates a seventh example of an embodiment of the present invention. In this example, a pair of rolling bearing units are configured only by a pair of conical roller bearings 44. More specifically, an inside disk 8b that includes a combination of a pair of disk elements 7a and a ring-shaped member 25 is supported around a sleeve 5a by a pair of conical roller bearings 44 having a face-to-face combination contact angle so that relative rotation with respect to a rotating shaft 2b and the sleeve 5a is possible. The toroidal continuously variable transmission of this example is configured such that a pair of disk springs 36 are sandwiched and held in an elastically deformed state between the outside end surfaces in the axial direction of the outer rings of the pair of conical roller bearings 44 and the inner-diameter side stepped surfaces 30 of the pair of disk elements 7, thereby elastically pressing the outer rings of the pair of conical roller bearings 44 inward in the axial direction. As a result, a preloading mechanism that applies a preload in the axial direction to the pair of conical roller bearings 44 is configured. The configuration and function of the other portions are the same as in the first example of an embodiment of the present invention.

Eighth Example

Figure 10:
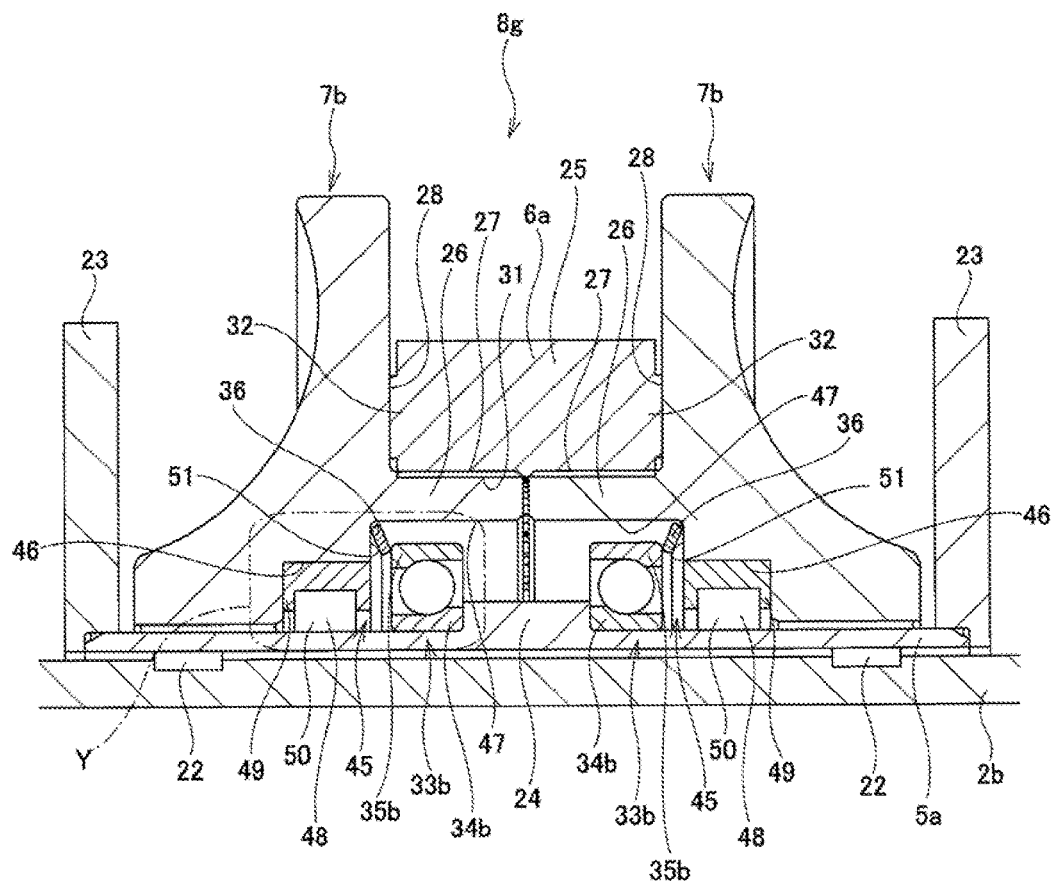
FIG. 10 is a view similar to FIG. 1 and illustrates the eighth example of an embodiment of the present invention.

FIG. 10 illustrates the eighth example of an embodiment of the present invention. In this example, an inside disk 8g that includes a combination of a pair of disk elements 7b and a ring-shaped member 25 is supported around a sleeve 5a by a pair of rolling bearing units 45 so that relative rotation with respect to a rotating shaft 2b and the sleeve 5a is possible. To achieve this, a mating surface portion 46 having an inner diameter that is larger than the inner diameter of the outside end portion is provided in the middle portion in the axial direction of the inner-circumferential surface of each of the pair of disk elements 7b, and a cylindrical surface portion 47 having an inner diameter that is larger than the inner diameter of the mating surface portion 46 is provided on the inside end portion in the axial direction of the inner-circumferential surface of each of the pair of disk elements 7b. The pair of rolling bearing units 45 includes a pair of cylindrical roller bearings 48 and a pair of ball bearings 33b having a face-to-face combination contact angle. The pair of cylindrical roller bearings 48 is configured by a pair of outer rings 49 that are fitted into the mating surface portions 46 of the pair of disk elements 7b with an interference fit, and a plurality of cylindrical rollers 50 that are arranged in the circumferential direction between the outer-ring raceways formed around the inner-circumferential surfaces of the pair of outer rings 49 and the outer-circumferential surface of the sleeve 5a. Incidentally, the pair of cylindrical roller bearings may be configured by a pair of outer rings that are fitted into the mating surface portions of the pair of disk elements with an interference fit, a pair of inner rings that are fitted onto the sleeve with an interference fit, and a plurality of cylindrical rollers that are arranged in the circumferential direction between the outer-ring raceways that are formed around the inner-circumferential surface of the pair of outer rings and the inner-ring raceways that are formed around the outer-circumferential surface of the pair of inner rings.

The pair of ball bearings 33b, each of which is a radial rolling bearing, is configured so that the inside end surfaces in the axial direction of the pair of inner rings 34b come in contact with both side surfaces in the axial direction of an outward-facing flange portion 24 provided around the middle portion of the sleeve 5a, and in this state, the pair of inner rings 34b is fitted onto the sleeve 5a with an interference fit. On the other hand, the outer-circumferential surfaces of the pair of outer rings 35b face the cylindrical surface portions 47 of the pair of disk elements 7b via gaps in the radial direction. Then, a pair of disk springs 36 having a truncated cone shape in the cross section is sandwiched and held in an elastically deformed state between the stepped surfaces 51 that are continuous with the mating surface portions 46 and cylindrical surface portions 47 of the pair of disk elements 7b and the outside end surfaces in the axial direction of the outer rings 35b of the pair of ball bearings 33b, thereby elastically pressing the pair of outer rings 35b inward in the axial direction. As a result, a preloading mechanism that applies a preload in the axial direction to the pair of ball bearings 33b is configured. The dimensions in the radial direction of the gaps in the radial direction are set to a size making it possible to prevent excessive preloading of the pair of ball bearings 33b of the pair of radial rolling bearings regardless of the elastic deformation of the pair of disk elements 7b of the inside disk 8g that occurs during operation of the toroidal continuously variable transmission. The configuration and function of the other portions are the same as in the first example of an embodiment of the present invention.

Ninth Example

Figure 11:
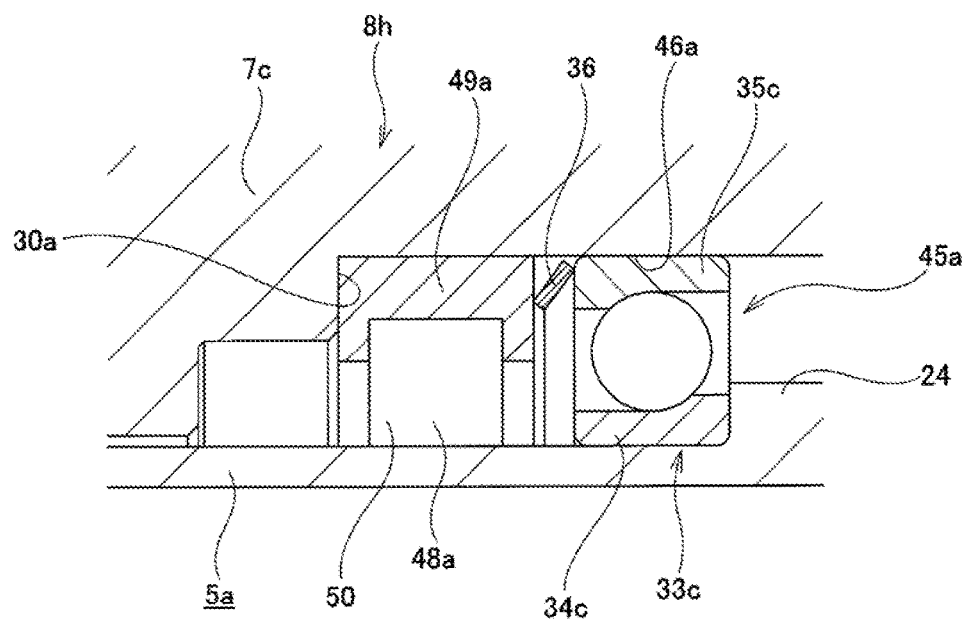
FIG. 11 illustrates the ninth example of an embodiment of the present invention, and corresponds to an enlarged view of portion Y in FIG. 10.

FIG. 11 illustrates the ninth example of an embodiment of the present invention. In the toroidal continuously variable transmission of this example, an inside disk 8h that includes a combination of a pair of disk elements 7c and a ring-shaped member 25 (refer to FIG. 1) is supported around a sleeve 5a by a pair of rolling bearing units 45a so that relative rotation with respect to a rotating shaft 2b (refer to FIG. 1) and the sleeve 5a is possible. Each of the pair of disk elements 7c comprises a mating surface portion 46a that is provided in the inner half portion in the axial direction of the inner-circumferential surface, and an inner-diameter side stepped surface 30a that faces inward in the axial direction and is provided on the outside end portion in the axial direction of the mating surface portion 46a.

Each of the pair of rolling bearing units 45a includes a cylindrical roller bearing 48a and a ball bearing 33c. The cylindrical roller bearing 48a is configured by fitting the outer ring 49a into the mating surface portion 46a with an interference fit and butting the outside end surface in the axial direction of the outer ring 49a against the inner-diameter side stepped surface 30a. A plurality of cylindrical rollers 50 are arranged between the outer-ring raceway that is formed around the inner-circumferential surface of the outer ring 49a and the outer-circumferential surface of the sleeve 5a so as to be able to freely roll. The ball bearing 33c that is a radial rolling bearing is configured by fitting the inner ring 34c onto the sleeve 5a with an interference fit and butting the inside end surface in the axial direction of the inner ring 34c against the outside surface in the axial direction of the outward-facing flange portion 24 provided around the middle portion of the sleeve 5a. A truncated cone shaped disk spring 36 is sandwiched and held in an elastically deformed shape between the outside end surface in the axial direction of the outer ring 35c of the ball bearing 33c and the inside end surface in the axial direction of the outer ring 49a of the cylindrical roller bearing 48a. A preloading mechanism that applies a preload in the axial direction to the ball bearing 33c is configured so that the disk spring 36 elastically presses the outer ring 35c inward in the axial direction. Incidentally, in this example, the stepped surface is configured by the inside end surface in the axial direction of the outer ring 49a of the cylindrical roller bearing 48a. The configuration and function of the other portions are the same as in the first example of an embodiment of the present invention.

Tenth Example

Figure 12:
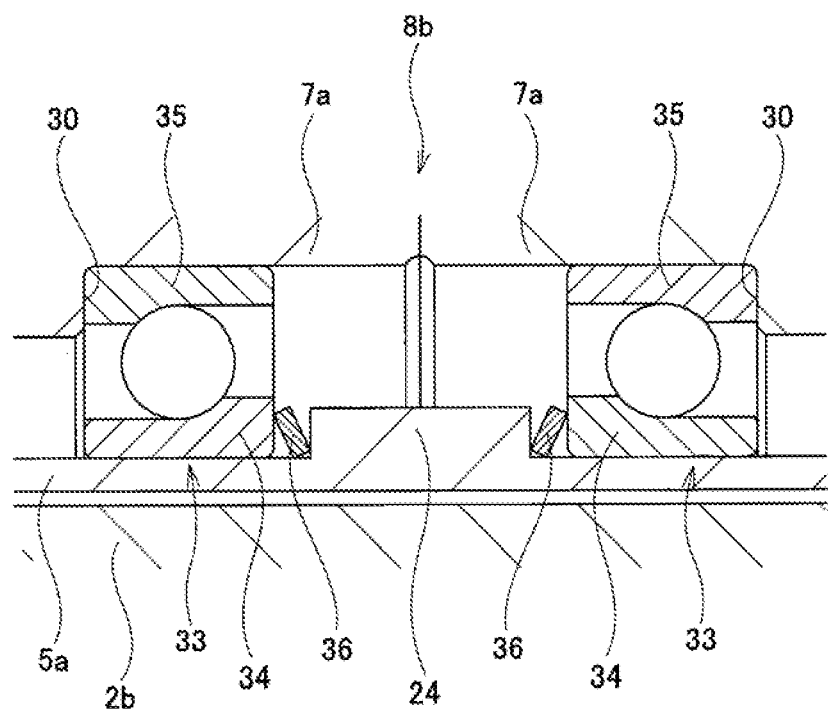
FIG. 12 illustrates the tenth example of an embodiment of the present invention, and corresponds to an enlarged view of portion Z in FIG. 5.

FIG. 12 illustrates the tenth example of an embodiment of the present invention. In the toroidal continuously variable transmission of this invention, an inside disk 8b that includes a combination of a pair of disk elements 7a and a ring-shaped member 25 (refer to FIG. 1) are supported around a sleeve 5a by a pair of ball bearings 33 having a face-to-face combination contact angle so that relative rotation with respect to a rotating shaft 2gb and the sleeve 5a is possible. In this example, in a state in which the outside end surfaces of the outer rings 35 of the pair of ball bearings 33 come in contact with the inner-diameter side stepped surfaces 30 of the pair of disk elements 7a, the outer rings 35 are fitted into a mating surface portion 29 of the disk element 7a with an interference fit. The inner rings 34 of the pair of ball bearings 33 are fitted onto the sleeve 5a with a clearance fit. Then, a pair of truncated cone shaped disk springs 36 are sandwiched and held in an elastically deformed state between the inside end surfaces in the axial direction of the inner rings 34 and both side surfaces in the axial direction of the outward-facing flange portion 24 of the sleeve 5a. A preloading mechanism that applies a preload in the axial direction to the pair of ball bearings 33 is configured so that the pair of disk springs 36 elastically press the inner rings 34 in a direction away from each other (outward in the axial direction). Incidentally, in this example, the stepped surfaces are configured by the both side surfaces in the axial direction of the outward-facing flange portion 24 of the sleeve 5a. The configuration and function of the other portions are the same as in the first example of an embodiment of the present invention.

It should be noted that in the case of embodying the toroidal continuously variable transmission of the present invention, as long as there is no contradiction, the construction of the above described examples of an embodiment of the present invention could be combined and implemented.

REFERENCE SIGNS LIST 1, 1a Toroidal continuously variable transmission
2, 2a, 2b Rotating shaft
3 Outside disk
4 Ball spline
5, 5a Sleeve
6, 6a Transmission gear
7, 7a to 7c Disk elements
8, 8a to 8h Inside disk
9 Power roller
10 Trunnion
11 Drive shaft
12, 12a Pressing apparatus
13 Radial needle bearing
14 Angular ball bearing
15, 15a Shim plate
16 Radial needle bearing
17 Support column
18 Thrust angular ball bearing
19 Actuator body
20 Connecting plate
21 Support plate
22 Radial needle bearing
23 Support member
24, 24a Outward-facing flange portion
25, 25a Ring-shaped member
26, 26a Small-diameter portion
27 Male spline portion
28 Outer-diameter side stepped surface
29 Mating surface portion
30, 30a Inner-diameter side stepped surface
31 Female spline portion
32 Convex portion
33, 33a to 33c Ball bearing
34, 34a to 34c Inner ring
35, 35a to 35c Outer ring
36 Disk spring
37 Shim plate
38 Shim plate
39 Locking groove
40 Locking ring
41 Inward-facing flange portion
42 Locking groove
43 Locking ring
44 Conical roller bearing
45 Rolling bearing unit
46 Mating surface portion
47 Cylindrical surface portion
48, 48a Cylindrical roller bearing
49, 49a Outer ring
50 Cylindrical roller
51 Stepped surface

The invention claimed is:

1. A toroidal continuously variable transmission, comprising:
a rotating shaft;
a pair of outside disks having inside side surfaces in an axial direction of the toroidal continuously variable transmission that are arc shaped in a cross section thereof, and supported with respect to the rotating shaft so as to be able to rotate in synchronization with the rotating shaft;
an inside disk having a pair of outside surfaces in the axial direction that are arc shaped in a cross section thereof and face the inside surfaces in the axial direction of the pair of outside disks, and supported with respect to the rotating shaft so as to be able to rotate relative to the rotating shaft;
a pair of rolling bearing units, each including a radial rolling bearing capable of supporting an axial load and comprising an outer ring, an inner ring, and a plurality of rolling bodies arranged between the outer ring and the inner ring, and arranged on an inside in a radial direction of the inside disk so as to support the inside disk so that relative rotation with respect to the rotating shaft is possible;
a plurality of power rollers arranged between the inside surfaces in the axial direction of the pair of outside disks and the pair of outside surfaces in the axial direction of the inside disk so as to be able to transmit power between the pair of outside disks and the inside disk; and
a preloading mechanism elastically pressing the outer ring of the radial rolling bearing in the axial direction,
wherein the outer rings of the radial rolling bearings of the pair of rolling bearing units are fitted into an inner-circumferential surface of the inside disk with a clearance fit, and
the preloading mechanism is configured by a pair of truncated cone shaped disk springs sandwiched and held between end surfaces in the axial direction of the outer rings of the radial rolling bearings of the pair of rolling bearing units, and stepped surfaces provided directly or by way of another member on the inside disk so as to face the end surfaces in the axial direction,
such that the rolling load applied to the inner-ring raceway and the outer-ring raceway of each of the pair of ball bearings is made substantially uniform in the circumferential direction.

2. A toroidal continuously variable transmission, comprising:
a rotating shaft;
a pair of outside disks having inside side surfaces in an axial direction of the toroidal continuously variable transmission that are arc shaped in a cross section thereof, and supported with respect to the rotating shaft so as to be able to rotate in synchronization with the rotating shaft;
an inside disk having a pair of outside surfaces in the axial direction that are arc shaped in a cross section thereof and face the inside surfaces in the axial direction of the pair of outside disks, and supported with respect to the rotating shaft so as to be able to rotate relative to the rotating shaft;
a pair of rolling bearing units including a pair of cylindrical roller bearings and a pair of ball bearings and arranged on an inside in a radial direction of the inside disk, the pair of cylindrical roller bearings supporting the inside disk so that relative rotation with respect to the rotating shaft is possible, and each of the pair of ball bearings including a radial ball bearing capable of supporting an axial load and comprising an outer ring, an inner ring, and a plurality of balls arranged between the outer ring and the inner ring;

a plurality of power rollers arranged between the inside surfaces in the axial direction of the pair of outside disks and the pair of outside surfaces in the axial direction of the inside disk so as to be able to transmit power between the pair of outside disks and the inside disk; and a preloading mechanism elastically pressing the outer ring of the radial ball bearing in the axial direction, wherein the pair of radial ball bearings of the pair of ball bearings are arranged on the inside in the radial direction of the inside disk with a gap in the radial direction between outer-circumferential surfaces of the outer rings of the pair of the ball bearings and the inner-circumferential surface of the inside disk facing the outer-circumferential surfaces of the outer rings; and the preloading mechanism is configured by a pair of truncated cone shaped disk springs sandwiched and held between end surfaces in the axial direction of the outer rings of the radial ball bearings of the pair of rolling bearing units, and stepped surfaces provided directly or by way of another member on the inside disk so as to face the end surfaces in the axial direction, such that the rolling load applied to the inner-ring raceway and the outer-ring raceway of each of the pair of ball bearings is made substantially uniform in the circumferential direction.

\* \* \* \* \*